US009799967B2

(12) United States Patent
Moosmayr et al.

(10) Patent No.: US 9,799,967 B2
(45) Date of Patent: Oct. 24, 2017

(54) ELECTRICALLY CONTACTING FASTENING DEVICE

(71) Applicant: Bayerische Motoren Werke Aktiengesellschaft, Munich (DE)

(72) Inventors: Tobias Moosmayr, Walkersbach (DE); Josef Forster, Ingolstadt (DE); Tobias Brandstetter, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/202,958

(22) Filed: Jul. 6, 2016

(65) Prior Publication Data
US 2016/0315399 A1 Oct. 27, 2016

Related U.S. Application Data

(63) Continuation of application No. PCT/EP2014/074873, filed on Nov. 18, 2014.

(30) Foreign Application Priority Data

Jan. 17, 2014 (DE) .................. 10 2014 200 809

(51) Int. Cl.
*H01R 4/34* (2006.01)
*F16B 33/06* (2006.01)
(Continued)

(52) U.S. Cl.
CPC ............... *H01R 4/34* (2013.01); *F16B 33/06* (2013.01); *H01R 11/12* (2013.01); *H01R 11/26* (2013.01); *F16B 2001/0021* (2013.01)

(58) Field of Classification Search
CPC ... H01R 4/34; H01R 4/646; F16B 2001/0021; F16B 33/06
See application file for complete search history.

(56) References Cited

U.S. PATENT DOCUMENTS 2,150,875 A * 3/1939 Caminez ................. F16B 37/12
29/456
3,295,580 A * 1/1967 Waltermire ........... F16B 39/282
411/187
(Continued)

FOREIGN PATENT DOCUMENTS

DE 20 2005 021 114 U1 3/2007
DE 10 2006 012 761 A1 9/2007
(Continued)

OTHER PUBLICATIONS

International Search Report (PCT/ISA/210) issued in PCT Application No. PCT/EP2014/074873 dated Jan. 21, 2015 with English translation (five pages).
(Continued)

*Primary Examiner* — Briggitte R Hammond
(74) *Attorney, Agent, or Firm* — Crowell & Moring LLP

(57) ABSTRACT

An electrically contacting fastening device has a threaded bolt and a nut, between which an electric contact element can be arranged. The threaded bolt has a contacting portion for creating planar contact with the contact element, and a threaded portion. The nut can be secured on the threaded bolt by way of the threaded portion and at an end face has a contacting area for creating planar contact with the contact element. The threaded portion of the threaded bolt is provided with a lubricant coating and the contacting portion of the threaded bolt, the contact element and the end-face contacting area of the nut are permanently free of lubricant.

15 Claims, 1 Drawing Sheet

(51) Int. Cl.
*H01R 11/12* (2006.01)
*H01R 11/26* (2006.01)
*F16B 1/00* (2006.01)

(56) References Cited

U.S. PATENT DOCUMENTS

| | | | | |
|---|---|---|---|---|
| 4,502,092 | A | | 2/1985 | Bannink, Jr. et al. |
| 5,118,233 | A | * | 6/1992 | Mitchell ............... F16B 31/021 411/2 |
| 5,210,374 | A | * | 5/1993 | Channell ............. H02G 15/076 174/38 |
| 5,403,678 | A | * | 4/1995 | Fields .................. H01R 11/284 429/121 |
| 5,442,133 | A | * | 8/1995 | Arnold ............... B23K 35/0288 174/51 |
| 6,357,110 | B1 | * | 3/2002 | Shipp ...................... H01R 4/34 29/432.2 |
| 7,056,161 | B2 | * | 6/2006 | Delcourt ................. H01R 4/30 174/51 |
| 2001/0035003 | A1 | * | 11/2001 | Sinha ................... F01D 25/145 60/796 |
| 2002/0048498 | A1 | * | 4/2002 | Bartels ................. F16B 33/008 411/171 |
| 2002/0115317 | A1 | * | 8/2002 | Delcourt ................. H01R 4/30 439/84 |
| 2004/0253853 | A1 | | 12/2004 | Delcourt et al. |
| 2007/0269152 | A1 | * | 11/2007 | Davies .................... B64C 25/34 384/300 |
| 2007/0270002 | A1 | | 11/2007 | Braden et al. |
| 2010/0172717 | A1 | * | 7/2010 | Corbett .................... F16B 29/00 411/366.1 |
| 2011/0053434 | A1 | | 3/2011 | Seng et al. |
| 2011/0092144 | A1 | * | 4/2011 | Woods .................. B24B 45/003 451/522 |
| 2014/0287612 | A1 | | 9/2014 | Frenken |

FOREIGN PATENT DOCUMENTS

| | | |
|---|---|---|
| DE | 10 2008 010 352 A1 | 8/2009 |
| EP | 0 446 516 A1 | 9/1991 |
| EP | 1 564 422 A1 | 8/2005 |

OTHER PUBLICATIONS

German-language Written Opinion (PCT/ISA/237) issued in PCT Application No. PCT/EP20141074873 dated Jan. 21, 2015 (eight pages).

Chinese Office Action issued in counterpart Chinese Application No. 201480063170.2 dated May 17, 2017, with English Translation (Fourteen (14) pages).

* cited by examiner

ELECTRICALLY CONTACTING FASTENING DEVICE

CROSS REFERENCE TO RELATED APPLICATIONS

This application is a continuation of PCT International Application No. PCT/EP2014/074873, filed Nov. 18, 2014, which claims priority under 35 U.S.C. §119 from German Patent Application No. 10 2014 200 809.3, filed Jan. 17, 2014, the entire disclosures of which are herein expressly incorporated by reference.

BACKGROUND AND SUMMARY OF THE INVENTION

The invention relates to an electrically contacting fastening device having a threaded bolt and a nut, between which an electric contact element is arranged.

These types of contact connections are known in general, for example, from German Patent Document DE 20 2005 021 114 U1 or German Patent document DE 10 2008 010 352 A1.

In the case of the electrically contacting fastening of the nut and the threaded bolt having a contact element arranged in-between, high tightening torques are required at the nut, in order to maintain the predefined electrical resistance of the contacting for the entire service life. In the case of arc-ignited aluminum fastening and contacting devices having a threaded bolt, a contact element, preferably a cable lug, and a nut, a lubricant is therefore used for screwing the nut to the threaded bolt, because otherwise a plastic deformation of the thread and a type of welding-together of the bread material generally called a "galling of the thread", may occur when the nut is tightened.

Conventionally, such components used in mass production (for example, within the scope of a motor vehicle) of the fastening device (threaded bolt, nut) in the drum process, are coated with a lubricant, particularly all locations on the nut being coated with the lubricant. Although the lubricant promotes the fastening suitability at high tightening torques for ensuring a secure mechanical connection, it has poor electric conductivity and, because of its sliding characteristics, increases friction corrosion at the contact surfaces with respect to the contact element during its service life.

It is therefore an object of the invention to provide an electrically contacting fastening device having fastening elements made of aluminum, which, for its entire service life, ensures an electric contacting of the fastening element with respect to a contact element. The electric contacting is improved compared to the state of the art and permits an at least equal clamping force of the fastening elements onto the contact element, without the occurrence of material damage to the fastening elements.

This and other objects are achieved by an electrically contacting fastening device having a threaded bolt and a nut, between which an electric contact element is arranged. The threaded bolt has a contacting portion for providing planar contact of the contact element and a threaded portion. The nut can be fastened on the threaded bolt by way of the threaded portion and, on the face side, has a contacting area for the planar contact with the contact element. The threaded portion of the threaded bolt is provided with a lubricant coating, and the contacting portion of the threaded bolt, the contact element and the face-side contacting area of the nut are kept free of lubricant, in order to ensure an optimal contacting for the entire service life. Since the problem of a welding together of material occurs mainly in the case of aluminum or other soft metals as a result of high tightening torques, the invention particularly relates to such fastening elements (threaded bolts, nuts). The permanently lubricant-free faces of the nuts and of the contact portion of the threaded bolt additionally reduce the expenditures for the coating and cleaning respectively, because "permanently lubricant-free" is defined according to the invention such that lubricant is or was applied at no point in time. An embodiment with a lubricant coating and a subsequent cleaning is therefore not "permanently lubricant-free" according to the invention.

In an embodiment, the nut is designed as a cap nut which is placed onto the threaded bolt and is screwed to it, the face of the cap nut forming the contact area remaining lubricant-free. Because the threaded bolt is already coated with lubricant, the thread of the cap nut may also be free of lubricant. An excess of lubricant on both fastening elements may also result in an overloading of the material and a wetting of the contact surfaces, which is undesirable.

In an advantageous embodiment of the invention it is provided that the threaded bolt has a planar and disk-shaped contacting portion. Likewise, it is advantageous that the face-side contacting area of the nut has a planar design in order to achieve a best-possible contacting and sealing of the contact area. The contact element preferably has a coplanarity in a range of 30-65 µm, more preferably 30-50 µm, respectively, with the contacting area of the nut and the contacting portion of the threaded bolt.

Such a coplanarity permits a tight, corrosion-resistant fastening between the threaded bolt, the contact element and the nut for the entire service life.

In a further advantageous embodiment, it is provided that the contact element (for example, the cable lug) has a tin coating at least in the contact area, which tin coating preferably has a thickness of 10-15 µm. The defined thickness ensures a compensation for irregularities but simultaneously prevents chipping or detachments.

As the method of providing such an electrically contacting fastening device, it is provided that the lubricant coating of the threaded bolt is applied by dipping or by a flowing around. In an advantageous embodiment, the threaded portion of the threaded bolt is guided through a lubricant bath, while the threaded bolt is held on the contacting portion. The contacting portion may, for example, be held on a rail device moved in an automated manner, while the threaded portion is guided through the lubricant bath, suspended, as a result of gravitational force.

Optionally, the above characteristics can be combined, if technically conceivable.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
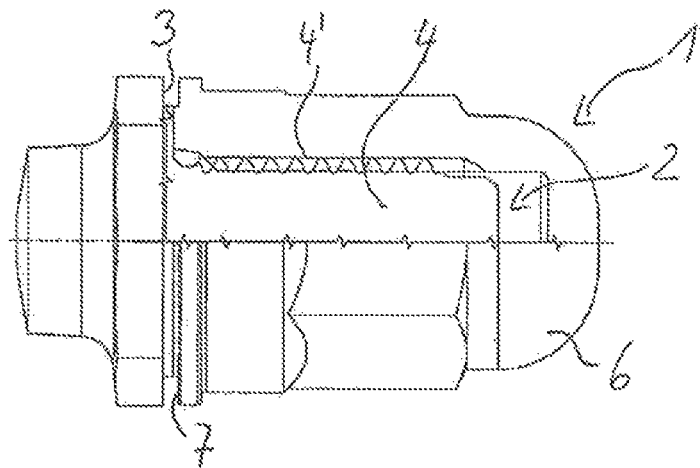
FIG. 1 is a partially sectional side view of the fastening device without the contact element.
Figure 2:
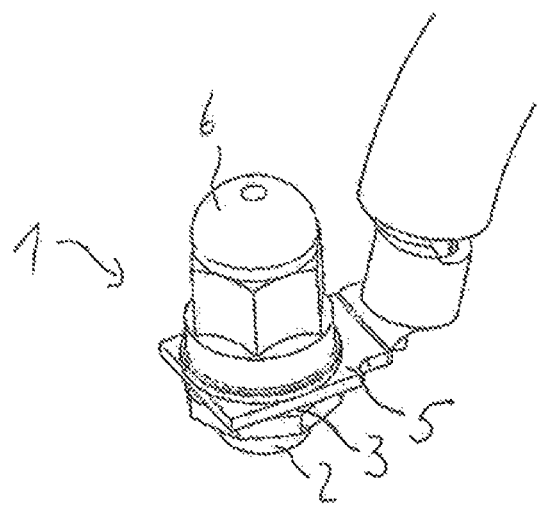
FIG. 2 is a perspective view of the fastening device from FIG. 1 with the contact element.

FIG. 1 is a partially sectional view of the electrically contacting fastening device 1 having a threaded bolt 2 and a nut 6. FIG. 2 illustrates the fastening device of FIG. 1 in a perspective view with the electric contact element 5 arranged between the threaded bolt 2 and the nut 6.

The arrangement of FIG. 1 reflects the delivery condition of the threaded bolt 2 and the nut 6. During the mounting of the fastening device, for example, on a motor vehicle frame, the contact element 5 is inserted and the nut 6 is tightened with a predefined tightening torque. This fastening has to hold for the entire service life of the motor vehicle without any reduction of the electric conductivity or without any corroding of the components in the gap between the contact element 5 and the nut 6 or threaded bolt 2. An M10 threaded bolt and an M10 nut made of aluminum are shown which are fastened, for example, with a tightening torque of 14-20 Nm. The contact element 5 is a contact lug for electrical grounding, for example, of a motor vehicle sensor.

The nut 6, designed as a cap nut, is fastened on the threaded bolt 2 by way of the threaded portion 4 and, on the face-side, has a contacting area 7 for the planar contact with the contact element 5. Only the threaded portion 4 of the threaded bolt 2 is provided with a lubricant coating in order to ensure the high tightening torques and the correspondingly high clamping force without any material damage to the thread. The contacting portion 3 of the threaded bolt 2, the contact element 5 and the face-side contacting area 7 of the nut 6, in contrast, are permanently free of lubricant and make it possible to obtain a good direct electrical contacting, which remains the same over the service life, without any lubricant layer situated in-between.

The threaded bolt 2 has a planar and disk-shaped contact portion 3. The face-side contacting area 7 of the nut 6 also has a planar design so that, in the fastened condition according to FIG. 2, the contact element 5 will rest in a planar and tight manner against the contacting portion 3 and the contacting area 7. The contact element 5 has a tin coating of 10-15 μm in order to compensate for irregularities and prevent detachment. The permanent corrosion-resistant fastening is further achieved by the excellent co-planarity of the contact element 5 with the contacting area 7 of the nut 6 and the contacting portion 3 of the threaded bolt 2, which is in the range of 30-65 μm respectively.

With respect to its implementation, the invention is not limited to the above-mentioned preferred embodiments. Rather, a number of variants is contemplated, which utilize the illustrated solution also in the case of embodiments of fundamentally different types. A special matt tin can, for example, be used as the tin coating.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrically contacting fastening device, comprising:
   a threaded bolt;
   an electric contact element; and
   a nut, wherein
   the electric contact element is arrangable between the threaded bolt and the nut,
   the threaded bolt has a contacting portion for planar contact with the electric contact element, and a threaded portion,
   the nut is fastenable on the threaded bolt by way of the threaded portion and, on a face side, has a contacting area for planar contact with the electric contact element,
   the threaded portion of the threaded bolt is provided with a lubricant coating, and
   the contacting portion of the threaded bolt, the electric contact element and the face-side contacting area of the nut are permanently free of lubricant,
   the electric contact element has a co-planarity in a range of 30-65 μm respectively with the contacting area of the nut and the contacting portion of the threaded bolt, so that in a fastened condition, the electric contact element rests against the contacting portion and the contacting area in a planar and tight manner, whereby the electrically contacting fastening device is resistant to corrosion.

2. The electrically contacting fastening device according to claim 1, wherein the threaded bolt and the nut are made of aluminum.

3. The electrically contacting fastening device according to claim 1, wherein the nut is configured as a cap nut.

4. The electrically contacting fastening device according to claim 1, wherein the threaded bolt has a planar and disk-shaped contacting portion.

5. The electrically contacting fastening device according to claim 1, wherein the face-side contacting area of the nut has a planar configuration.

6. The electrically contacting fastening device according to claim 1, wherein the electric contact element has a tin coating of 10-15 μm.

7. The electrically contacting fastening device according to claim 2, wherein the nut is configured as a cap nut.

8. The electrically contacting fastening device according to claim 7, wherein the threaded bolt has a planar and disk-shaped contacting portion.

9. The electrically contacting fastening device according to claim 8, wherein the face-side contacting area of the nut has a planar configuration.

10. The electrically contacting fastening device according to claim 9, wherein the contact element has a tin coating of 10-15 μm.

11. A method of providing an electrically contacting fastening device having a threaded bolt and a nut between which an electric contact element is arrangeable, the method comprising the acts of:
   providing the threaded bolt having a contacting portion and a threaded portion;
   providing the nut having a threaded portion and a face-side contacting area; and
   applying a lubricant coating, via dipping or by a flowing around, on the threaded portion of the threaded bolt, and maintaining the contacting portion of the threaded bolt, the face-side contacting area of the nut, and the contact element arrangeable between the contacting portion and the face-side contacting area permanently free of lubricant, wherein
   wherein the act of applying the lubricant coating is carried out by guiding the threaded portion of the threaded bolt through a lubricant bath, while the threaded bolt is held by the contacting portion on a movable rail.

12. The method according to claim 11, wherein the electric contact element has a co-planarity in a range of 30-65 μm respectively with the contacting area of the nut and the contacting portion of the threaded bolt, so that upon tightening, the electric contact element rests against the contacting portion and the contacting area in a planar and tight manner, whereby the electrically contacting fastening device is resistant to corrosion.

13. An electrically contacting fastening device, comprising:
- a threaded bolt;
- an electric contact element; and
- a nut that is fastenable to the threaded bolt, wherein
    the electric contact element is disposed between the threaded bolt and the nut,
    the threaded bolt has a contacting portion for planar contact with the electric contact element, and a threaded portion,
    the nut is fastenable on the threaded bolt by way of the threaded portion and, on a face side, has a contacting area for planar contact with the electric contact element, and
    the electric contact element has a co-planarity in a range of 30-65 μm respectively with the contacting area of the nut and the contacting portion of the threaded bolt, so that upon tightening, the electric contact element rests against the contacting portion and the contacting area in a planar and tight manner, whereby the electrically contacting fastening device is resistant to corrosion.

14. The electrically contacting fastening device according to claim 13, wherein the threaded portion of the threaded bolt is provided with a lubricant coating.

15. The electrically contacting fastening device according to claim 13, wherein the contacting portion of the threaded bolt, the electric contact element and the face-side contacting area of the nut are permanently free of a lubricant coating.

* * * * *